(12) United States Patent
Qama et al.

(10) Patent No.: US 12,460,953 B2
(45) Date of Patent: Nov. 4, 2025

(54) METHOD FOR CALIBRATING LINEARIZATION FUNCTION FOR CORRECTING OUTPUT OF POSITION SENSOR

(71) Applicant: Renesas Electronics America Inc., Milpitas, CA (US)

(72) Inventors: Gentjan Qama, Aschheim (DE); Josef Janisch, Ilz (AT)

(73) Assignee: Renesas Electronics America Inc., Milpitas, CA (US)

( * ) Notice: Subject to any disclaimer, the term of this patent is extended or adjusted under 35 U.S.C. 154(b) by 350 days.

(21) Appl. No.: 18/166,606

(22) Filed: Feb. 9, 2023

(65) Prior Publication Data

US 2023/0251116 A1    Aug. 10, 2023

(30) Foreign Application Priority Data

Feb. 9, 2022   (EP) ..................................... 22155833

(51) Int. Cl.
*G01D 18/00* (2006.01)
*G01D 5/20* (2006.01)

(52) U.S. Cl.
CPC ....... *G01D 18/004* (2013.01); *G01D 2218/10* (2021.05)

(58) Field of Classification Search
CPC ............. G01D 18/004; G01D 2218/10; G01D 5/2053; G01D 18/008; G01D 18/00

USPC ................ 73/1.79; 324/202, 207.11–207.25; 702/86, 94, 104
See application file for complete search history.

(56) References Cited

U.S. PATENT DOCUMENTS

| | | | |
|---|---|---|---|
| 4,853,604 A | 8/1989 | McMullin et al. | |
| 11,099,036 B2 * | 8/2021 | Qama | G01D 5/2053 |
| 11,159,169 B2 * | 10/2021 | Ali | H03M 1/0641 |
| 2020/0072643 A1 * | 3/2020 | Qama | G01D 5/2053 |
| 2020/0096309 A1 * | 3/2020 | Qama | G01D 5/2053 |
| 2020/0280320 A1 * | 9/2020 | Ali | H03M 3/358 |
| 2021/0364652 A1 * | 11/2021 | Spasovski | G01S 19/23 |

FOREIGN PATENT DOCUMENTS

| | | | | |
|---|---|---|---|---|
| EP | 3627113 A1 | | 3/2020 | |
| EP | 3712569 A1 * | | 9/2020 | G01D 18/00 |

* cited by examiner

*Primary Examiner* — Laura Martin
*Assistant Examiner* — Anthony W Megna Fuentes
(74) *Attorney, Agent, or Firm* — SCULLY, SCOTT, MURPHY & PRESSER, P.C.

(57) ABSTRACT

A method for calibrating a linearization function for correcting an output of a position sensor providing a continuous output position signal is described. The method adds a new linearization point to the linearization function by detecting the maximum error at the output of the position sensor and applying the new linearization function to the output of the position sensor and repeat the adding new linearization points until all available linearization points have been defined.

11 Claims, 7 Drawing Sheets

METHOD FOR CALIBRATING LINEARIZATION FUNCTION FOR CORRECTING OUTPUT OF POSITION SENSOR

CROSS-REFERENCE TO RELATED APPLICATION

The present application claims priority under 35 U.S.C. § 119 to European Patent Application No. 22155833.1, filed on Feb. 9, 2022. The entire disclosure of European Patent Application No. 22155833.1 is incorporated by this reference.

BACKGROUND

The present application relates to a method for calibrating a linearization function for correcting the output of a position sensor providing a continuous output position signal. The present application further relates to a position sensor implementing the method.

Many applications need position feedback of a moving target like a rotating member, for example in motor control systems. In most cases, an additional position sensor is mounted at one end of a rotating shaft of the motor to generate the required position information. Conventionally, magnetic position sensors and inductive position sensors are known. Since current carrying parts like motor cables or battery cables, a rotating motor package, the stator of the motor or additional equipment like a motor brake cause magnetic fields that may disturb magnetic fields, the use of inductive position sensors is preferred to provide robustness against such magnetic fields.

There are disclosed techniques listed below.
[Patent Document 1] U.S. Pat. No. 4,853,604
[Patent Document 2] European Patent 3 627 113

Inductive position sensors implement a magnet-free technology, utilizing the physical principles of eddy currents or inductive coupling to detect the position of a target that is moving above a set of coils, consisting for example of one transmitter coil and two receiver coils, such as a sine receiver coil and a cosine receiver coil. Such an inductive sensor system is for example disclosed in Patent Document 1.

However, these systems exhibit inaccuracies for many reasons. For example, the electromagnetic field generated by the transmitter, and the resulting fields generated in the metallic target, may be non-uniform, the connections of wire traces to the transmitter coils and the arrangement of receiver coils may result in further non-uniformity. The air gap between the metallic target and the coils mounted on the Printed Circuit Board (PCB) may be non-uniform. Further, the amplitudes of signals generated by receiver coils may have an offset. There may be mismatches between the multiple receiver coils. There may be different coupling effects between the metallic target and each of the multiple receiver coils. These and other factors may result in inaccurate results of the position locating system.

To improve the accuracy of known position sensors, Patent Document 2 discloses a method of calibrating and linearization. According to this method, spatial angle data is read from the position sensor at a set of positions of a target swept over receive coils in the position sensor. From the spatial angle data, calibration parameters are calculated by matching an electrical measured position with a mechanical reference position. Afterwards initial position values are determined from the spatial angle data and the calibration parameters. The initial position values are used to determine linearization parameters by linearization of the measured position. The calibration parameters and linearization parameters are written into the position sensor.

SUMMARY

In an example, a method for calibrating a linearization function for correcting the output of a position sensor providing a continuous output position signal, wherein the linearization function has a predetermined number of linearization points, and wherein each linearization point specifies a correction factor for a corresponding position of the output signal of the position sensor, is generally described. The method comprises the steps of:
  setting an initial linearization point of the linearization function for a start position to a start position of the position sensor;
  setting a final linearization point of the linearization function for a last position to the final position of the position sensor;
  determining the output of the position sensor for a full period by applying the linearization function to the position signal of the position sensor for the full period;
  calculating an error vector for the full period of the position sensor by comparing the output of the position sensor with a reference signal, wherein the reference signal provides an ideal position signal for the full period of the position sensor;
  detecting the maximum error of the error vector and the corresponding position of the detected maximum error;
  setting a next linearization point of the linearization function to the position of the maximum error and a correction factor corresponding to the difference between the output of the position sensor and the ideal position of the reference signal for the position of the maximum error; and repeating the steps of determining the output of the position sensor, calculating the error vector, detecting the maximum error and setting the next linearization point until all available linearization points have been set.

Generally, the linearization function specifies correction factors for certain positions of the output of the position sensor. The correction factor corresponds to the difference of the position information of the position sensor and the position information of the reference signal at a certain position. For positions of the output of the position sensor between two linearization points the corresponding correction factor is obtained from interpolation between the adjacent linearization points. By applying the linearization function to the position signal of the position sensor, the correction factor is added to/subtracted from the position signal of the position sensor to correct the output of the position sensor. Between two linearization points, an interpolation is used to estimate the correction factor.

At the beginning of the method for calibrating the linearization, the initial linearization point of the linearization function for the start position is set to the start position of the position sensor and the last position is set to the final position of the position sensor. The start position and the final position of the position sensor are known. For example, a rotational position sensor has a starting position of 0° and a last position of 360°.

Next, the output of the position sensor is determined for a full period by applying the linearization function to the position signal of the position sensor for the full period.

During the first run, the error of the output of the position sensor is not corrected, since only the start position and the final position have been set.

Based on the determined output of the position sensor, an error vector for the full period of the position sensor is calculated by comparing the output of the position sensor with a reference signal. The reference signal provides an ideal position signal for the full period of the position sensor, e.g., using ideal input signals or a high-precision position sensor, for example from a laboratory set-up. Thus, the result of this step is an error vector relating to the error of the position sensor, since only the start position and the final position have been set. The error vector can also be referred to as error curve. The reference position can be determined using a certain sampling frequency, wherein the sampling frequency is much higher than the number of linearization points of the linearization function.

From the calculated error vector, the maximum error and the corresponding position of the maximum error are detected. This step searches for the biggest error in the output of the position sensor and detects the corresponding position.

A new linearization point is added to the linearization function corresponding to the position of the maximum error. The corresponding correction factor for the linearization equals to the difference between the output of the position sensor and the ideal position of the reference signal for the position of the maximum error. Thus, by applying the linearization function including the newly added linearization point to the output of the position sensor eliminates the previous maximum error. Since the correction of the output of the position sensor by applying the linearization function comprising a piecewise linearization between the linearization points of the linearization function, this also affects other parts of the previously calculated error vector.

Therefore, the steps of determining the output of the position sensor, calculating the error vector, detecting the maximum error and setting the next linearization point are repeated until all available linearization points have been set. With each repetition, the maximum error of the previously calculated error vector is eliminated and the error vector changes at least in the range between the neighbouring linearization points of the newly added linearization point. Thus, the error of the position sensor is successively reduced until all available linearization points are defined.

Each linearization point corresponds to a position of the position sensor and a correction factor at this position determined based on the difference of the output of the position sensor at this position and the ideal position defined by the reference signal at that position.

Once all linearization points have been determined, the linearization function can be stored in the position sensor, for example in a register of a signal processing unit of the position sensor. During use of the position afterwards, the linearization function is used to correct the output of the position sensor and to fulfil certain requirements like Automotive Safety Integrity Levels (ASIL), e.g., required by autonomous driving systems.

The linearization function comprises for example at least 16 linearization points, not including the initial and final linearization points. To improve the accuracy of the position sensor the number of linearization points can be increased. However, the processing power and storage of position sensors is limited, which restricts the number of linearization points of the linearization function. In a variant, the method comprises the step of applying a zero calibration to the position sensor signal setting a mechanical initial position of the position sensor to a position value of zero. Thus, the start position of the position sensor is zero, like e.g., 0° for a rotational sensor.

According to a variant, the method further comprises the step of applying a zero calibration to the reference signal setting a mechanical initial position of the reference signal to a position value of zero. Thus, the start position of the position sensor signal and the start position of the reference signal are synchronized each period, as both start at zero.

Pursuant to a variant, the reference signal is provided by an external high precision position sensor system. Alternatively, the reference signal is generated by using an ideal input signal for calculating the position and the corresponding ideal output of the position sensor.

In a variant, the method comprises the further step of sorting the linearization points of the linearization function in ascending order from the initial linearization point to the final linearization point. This simplifies the linearization function, as the processing unit can easily calculate the slope between each two linearization points of the linearization function, which is required to apply the linearization function to the continuous output signal of the position sensor. The linearization points are sorted based on the corresponding position.

According to a variant, the repeating of the steps of determining the output of the position sensor, calculating the error vector, detecting the maximum error and setting the next linearization point is stopped, if the next linearization point corresponds to an already existing linearization point of the linearization function within a predefined minimum distance. The repeating of the afore-mentioned steps can be stopped if the present detect maximum error corresponds to an already existing linearization point within the predefined minimum distance because no new linearization points can be added, that will increase the accuracy of the output of the position sensor.

Pursuant to a variant, the method comprises the step of comparing the position of the detected maximum error for the current linearization point with the detected positions of the maximum errors for all previous linearization points. If both positions are equal to each other, both linearization points are considered as equal and the repeating of the steps of determining the output of the position sensor, calculating the error vector, detecting the maximum error and setting the next linearization point is stopped.

In a variant, the method comprises during each repetition the step of revising the correction factors corresponding to the difference between the output of the position sensor and the ideal position of the reference signal for all linearization points between the initial linearization point and the final linearization point. The error vector of the detected error of the output of the position system changes every time a new linearization point is added to the linearization function. This can also have a small impact on the correction factor of linearization point. Thus, to further increase the accuracy of the method, the correction factors of all linearization points are revised during each repetition of the steps of determining the output of the position sensor, calculating the error vector, detecting the maximum error and setting the next linearization point.

According to a variant, the step of revising the correction factors is performed after a new linearization point has been set, for example, after the linearization points have been sorted in the ascending order. Thus, this is the last step before a new repetition starts or before the method is ended because all linearization points have been defined.

In an example, a position sensor comprising a signal processing unit implementing the method is generally described. The position sensor comprises a non-volatile storage for storing the linearization function determined by the method. The stored linearization function can afterwards be applied to the output of the position sensor.

BRIEF DESCRIPTON OF THE DRAWINGS

Embodiments will be further explained with respect to the figures.

DETAILED DESCRIPTION

Figure 1:
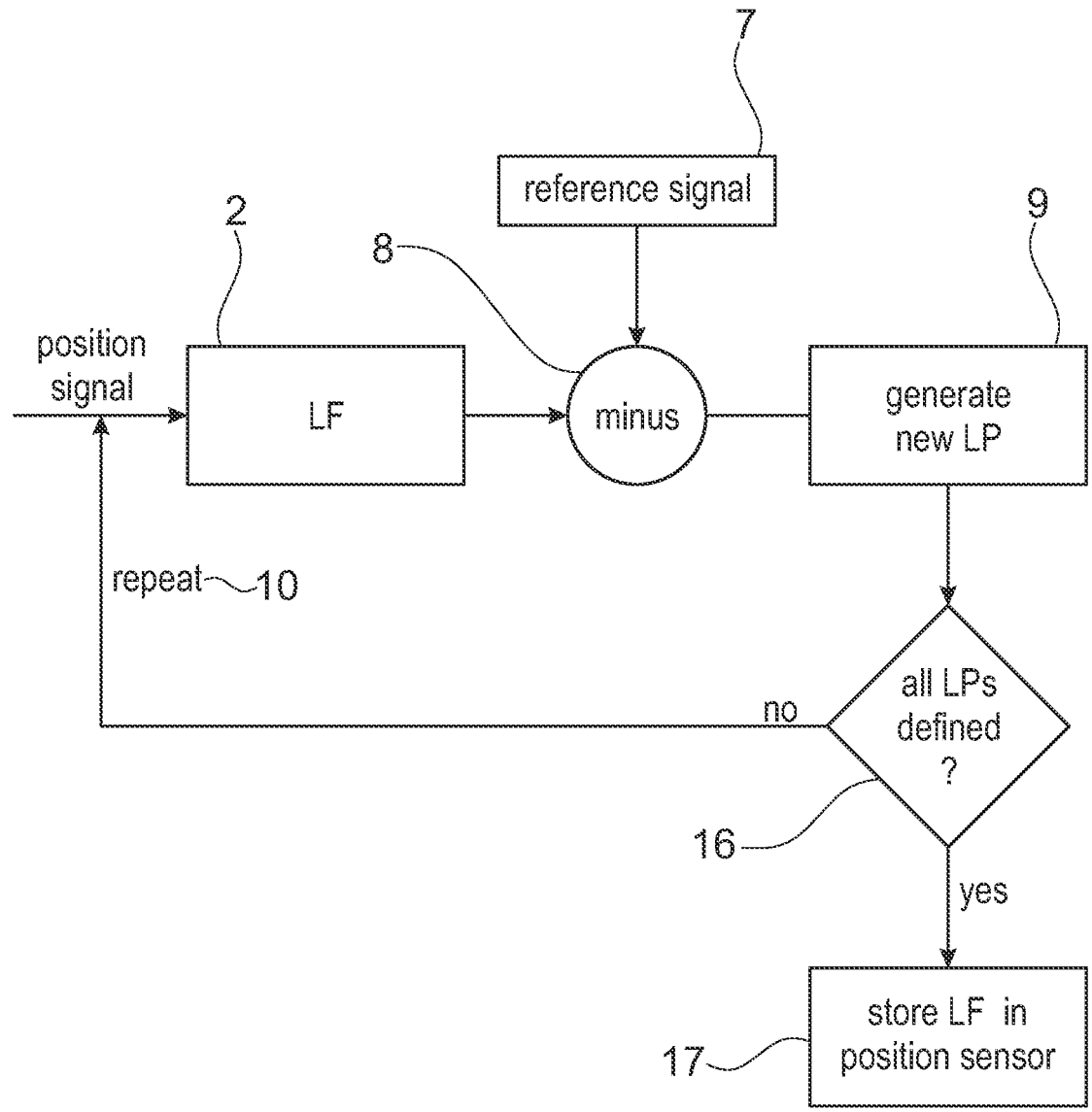
FIG. 1 is a flow diagram showing a generic overview of a method.

FIG. 1 shows a flow diagram showing a generic overview of the method 1 according to an embodiment. The method 1 is intended for calibration of a linearization function 2 for correcting the output of a position sensor. The position sensor provides a continuous output signal.

The linearization function 2 has a predetermined number of linearization points, wherein each linearization point specifies a correction factor for a corresponding position of the output signal of the position sensor. Thus, each linearization point comprises two values, one value specifying the position and one value specifying the correction value at this position.

After setting 3 the initial linearization point to a starting position that corresponds to the start position of the position sensor and setting 4 the final linearization point to a last position that corresponds to the final position of the position sensor the method 1 is used to specify the other linearization points of the linearization function 2.

The linearization function 2 is applied to the position signal of the position sensor for a full period. Afterwards the result is compared to a reference signal 7, wherein the reference signal 7 provides an ideal position signal for the full period of the position sensor.

Based on the previous comparison, the maximum error of the position signal is identified and a new linearization point is generated 9. The first value of the new linearization point corresponds to the position of the identified maximum error and the second value of the linearization point corresponds to a correction factor, wherein the correction factor is the difference between the position signal of the position sensor and the reference signal at the position of the identified maximum error.

After the new linearization point has been added 18 to the linearization function 2, the method 1 checks 16 if all linearization points of the linearization function 2 have been specified.

If not all linearization points have been specified, the previous steps will be repeated for a new full period of the position signal of the position sensor, this time using the linearization function 2 including the newly added linearization point. This is repeated until all available linearization points have been added 18 to the linearization function 2.

After all linearization points have been added 18 to the linearization function 2, the method 1 stores 17 the linearization function 2 in a storage of the position sensor. During use, the position sensor can afterwards apply the stored linearization function 2 to the position signal to increase the accuracy of the output position signal of the position sensor. Thus, the calibration of the linearization function 2 ends with storing it in a storage like an internal register of the position sensor.

Figure 2:
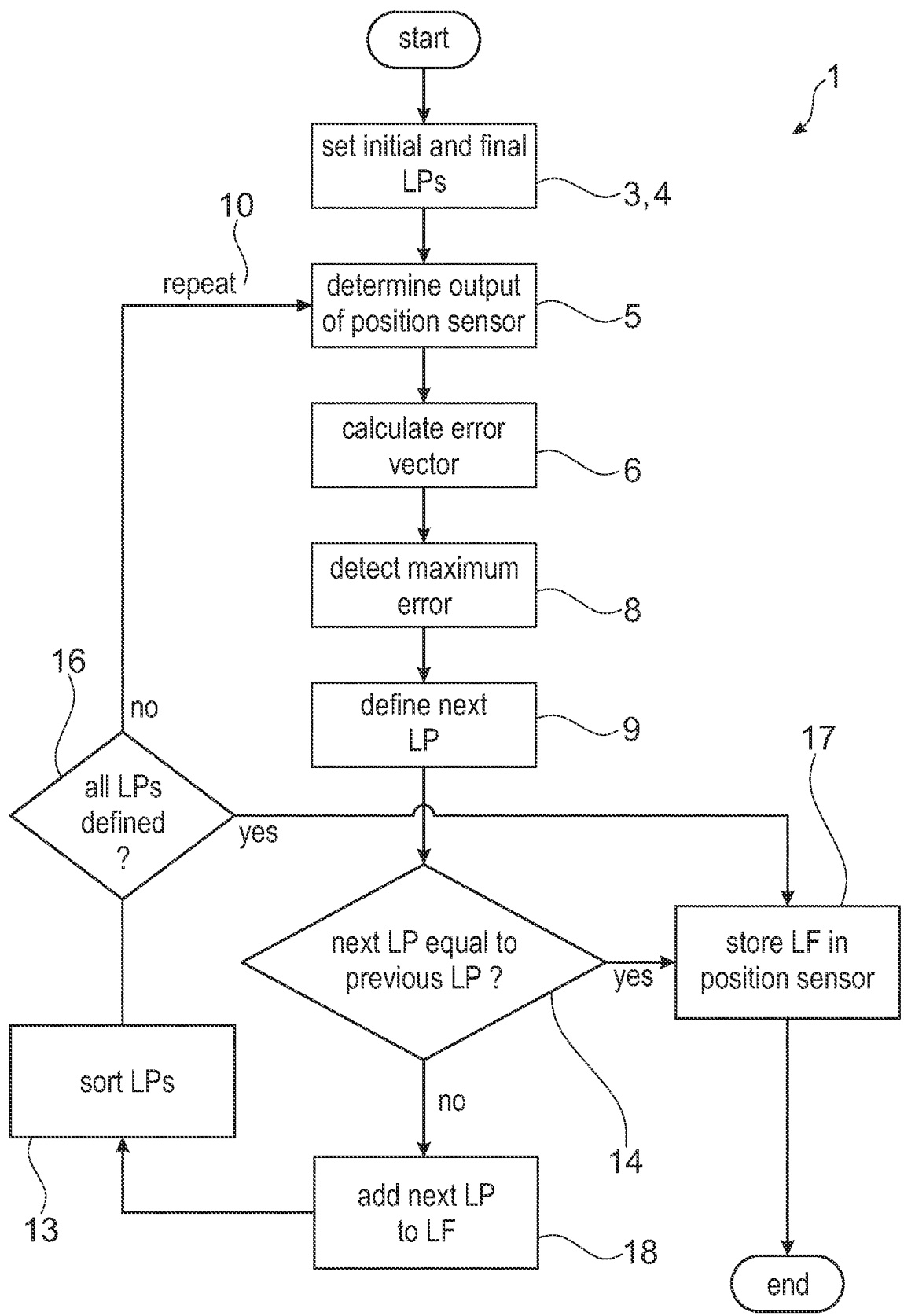
FIG. 2 is a flow diagram showing a first detailed embodiment of the method.

FIG. 2 shows a flow diagram showing a first detailed embodiment of the method 1. The method 1 is used for calibrating a linearization function 2 to correct the output of a position sensor. The position sensor provides a continuous output signal.

After the method 1 has been started, the initial linearization point is set 3 and the final linearization point is set 4, as already explained above with respect to FIG. 1.

In the next step, the output of the position sensor is determined 5 for a full period by applying the linearization function 2 to the position signal of the position sensor for the full period. At this stage the linearization function 2 only comprises the initial linearization point and the final linearization point.

Afterwards an error vector is calculated 6 for the full period of the position sensor. This is done by comparing the output of the position sensor with a reference signal 7. The reference signal 7 provides an ideal position signal for the full period of the position sensor. The reference signal 7 is for example provided by an external high precision position sensor system. Alternatively, the reference signal 7 is generated by using an ideal input signal for calculating the position, resulting in an ideal output of the position sensor.

After calculating 6 the error vector, the maximum error of error vector is detected 8. Furthermore, the position of the detected maximum error is detected from the error vector.

A new linearization point of the linearization function 2 is defined 9. The new linearization point has a position value corresponding to the position of the previously detected position of the maximum error and a correction factor corresponding to the difference between the output of the position sensor and the ideal position of the reference signal for the position of the maximum error. For example, in the next comparison 14, it is checked if the new linearization point corresponds to an already existing linearization point within a predefined minimum distance, for example, if the position values of linearization points are equal or within the predefined minimum distance, i.e., are highly similar to each other. If the comparison 14 reveals that the new linearization point corresponds to an already existing linearization point within the predefined minimum distance, the method 1 proceeds with the last step of storing 17 the linearization function 2 with all so far added linearization points in a storage of the position sensor.

If the new linearization point does not correspond to any other linearization point, the new linearization point is added 18 to the linearization function 2.

Optionally, the linearization points of the linearization function 2 are sorted 13 in an ascending order from the initial linearization point to the final linearization point.

Afterwards the method 1 checks if all linearization points of the linearization function 2 have been specified. If this is the case, the method 1 proceeds to the last step of storing 17 the linearization function 2 with all so far added linearization points in a storage of the position sensor.

If not all linearization points have been defined, the method 1 repeats 10 the steps of determining (5) the output of the position sensor, calculating (6) the error vector, detecting (8) the maximum error, setting (9) the next linearization point, comparing 14 the new linearization point will all previous linearization points, adding 18 the new linearization point to the linearization function 2 and sorting 13 the linearization points of the linearization function 2 until all available linearization points have been set.

After the method 1 has calibrated the linearization function 2, i.e., all linearization points of the linearization function 2 have been defined, the linearization function 2 is stored in the position sensor. During use of the position sensor in an application, like in an automotive application, the linearization function 2 is used to correct the position signal of the position signal to guarantee a certain maximum error. Thus, certain Automotive Safety Integrity Levels can be fulfilled.

Figure 3:
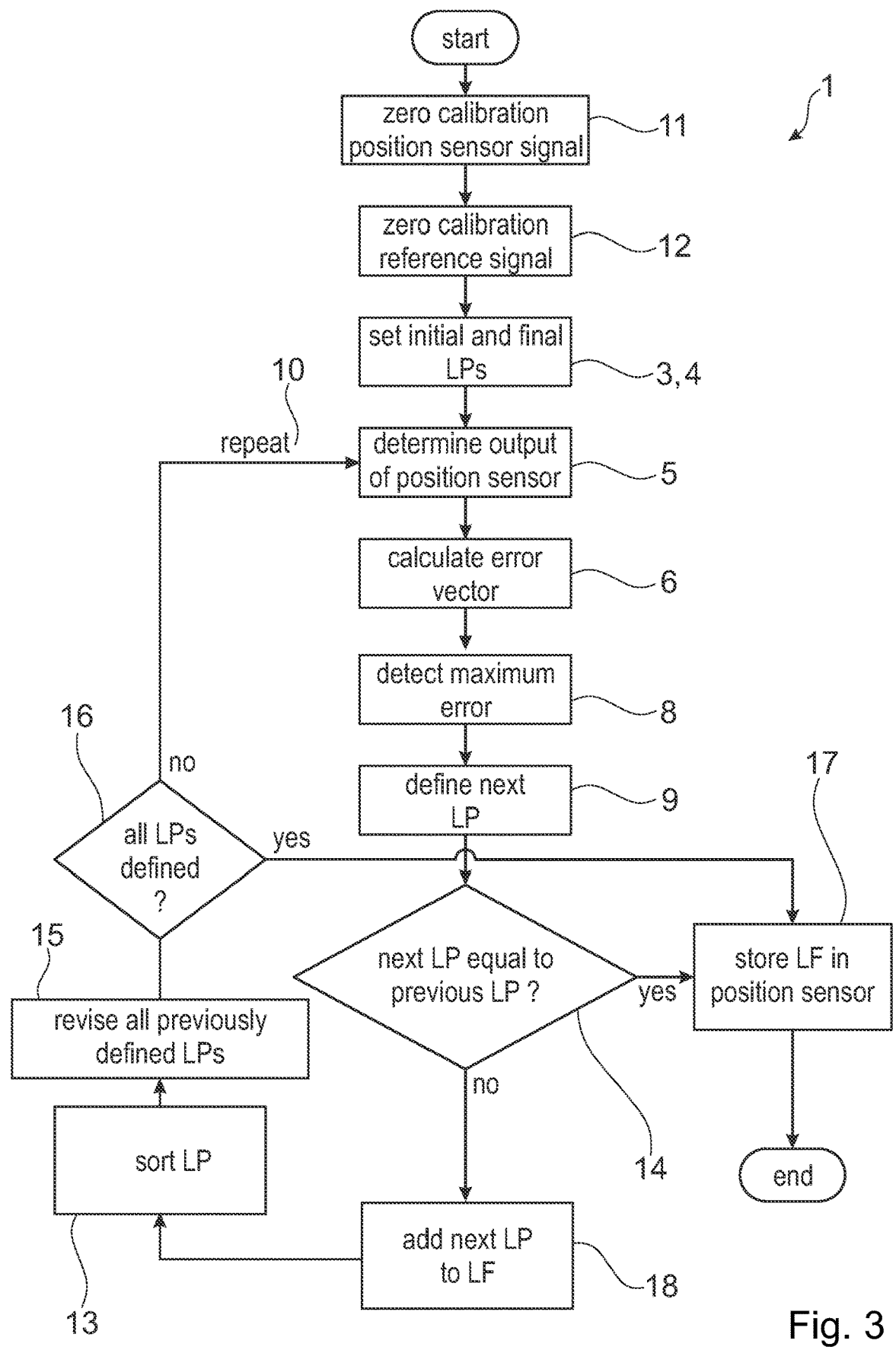
FIG. 3 is a flow diagram showing a second detailed embodiment of the method.

FIG. 3 shows a flow diagram showing a second detailed embodiment of the method 1. In comparison to the method 1 disclosed in FIG. 2, the method 1 shown in FIG. 3 comprises at the beginning the steps of applying zero calibration 11 to the position sensor signal setting a mechanical initial position of the position sensor signal to a position value of zero and of applying a zero calibration 12 to the reference signal setting a mechanical initial position of the reference signal to a position value of zero. Thus, the position signal of the position sensor and the reference signal both have a starting value of zero. For example, a rotational position sensor starts at 0°. This has the advantage that the position sensor can be synchronized easily every period because zero crossing are easy to detect.

The method 1 shown in FIG. 3 comprises a further additional step after the sorting 13 of the linearization points of the linearization function 2. According to this additional step the correction factors corresponding to the difference between, the output of the position sensor and the ideal position of the reference signal for all linearization points between the initial linearization point and the final linearization point are revised 15. During the revising 15 the correction factors of all linearization points between the initial linearization point and the final linearization point are set to the recalculated difference between the output of the determination 5 and the reference signal 7 at the position of the respective linearization point.

FIGS. 4A-4H shows diagrams of the original error and after defining several linearization points of the linearization function 2. On the x-axis the position in degree is shown from 0° to 360°, like for a rotational position sensor. On the y-axis the error in percent is shown.

Figure 4A:
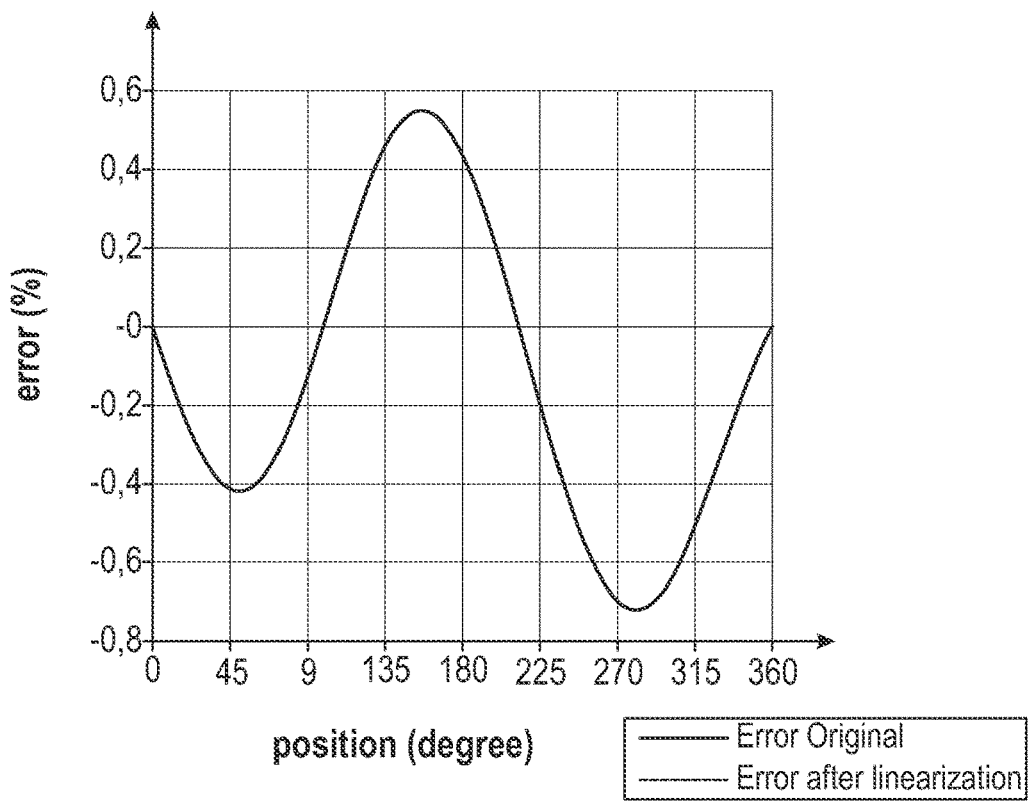
FIGS. 4A-4H are diagrams of the original error and after defining several linearization points of the linearization function.

FIG. 4A shows the error of the position signal in case only the initial linearization point and the final linearization point are defined in the linearization function 2. The maximum error of the output of the position sensor is at about 280°. Thus, the next linearization point is defined for the position of 280° and the correction factor is the difference between the output signal of the position sensor and the reference signal.

Figure 4B:
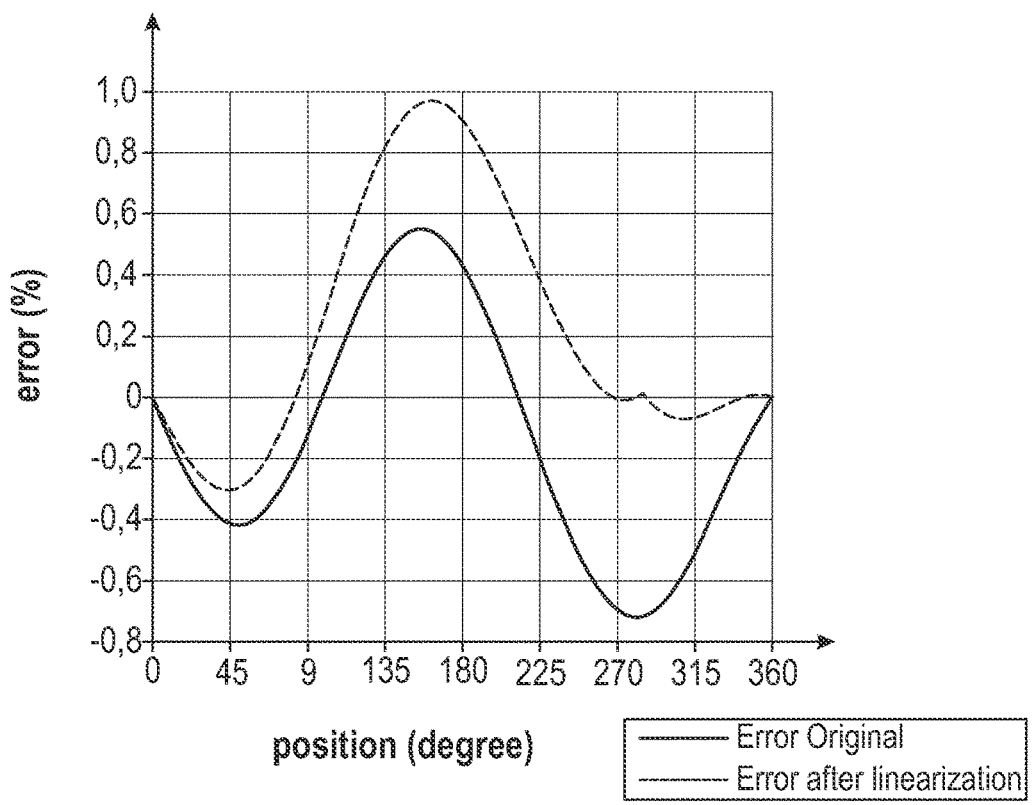

FIG. 4B shows the original error of FIG. 4A and the error of the position signal for a linearization function 2 including the afore-mentioned new linearization point at 280°. Due to this linearization point at 280° the error at this position is 0 because it has been compensated by the correction factor of the linearization point at 280°. According to FIG. 4B, the new maximum error is at about 160° and the next linearization point is set to 160° and a corresponding correction factor.

Figure 4C:
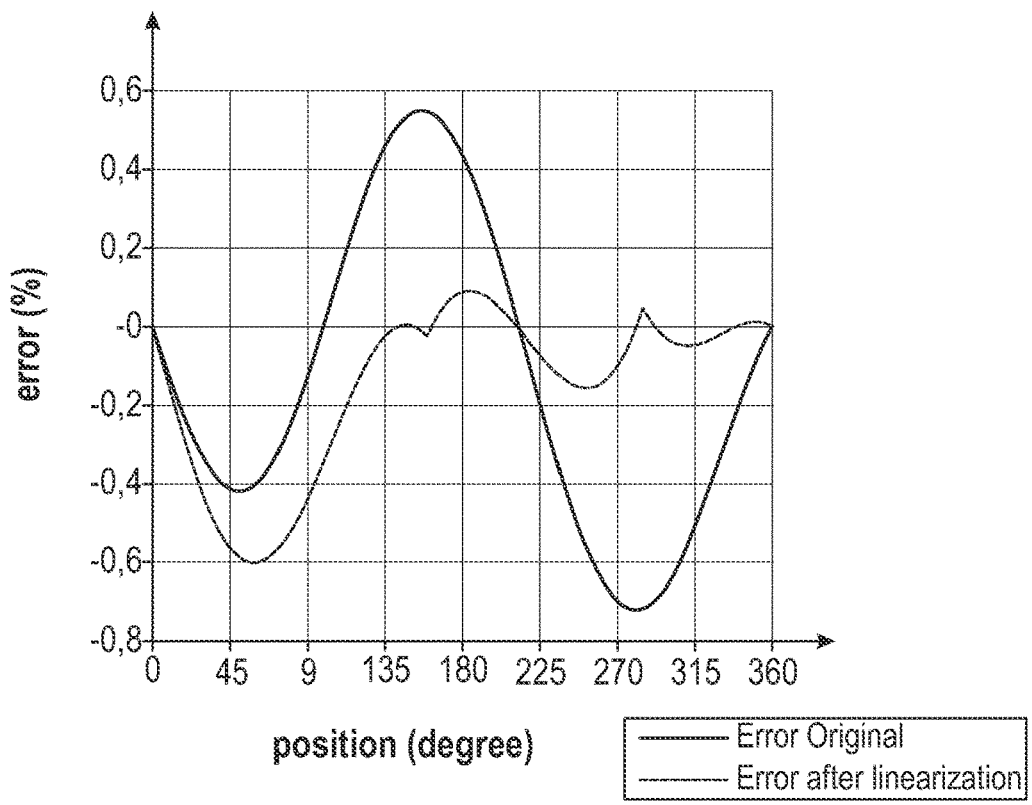

FIG. 4C shows the error of the position signal achieved by applying the linearization function 2 including the linearization points at 160° and at 280°. The new maximum error of the position signal is located at about 55° and a corresponding linearization point at 55° is added to the linearization function 2.

Figure 4D:
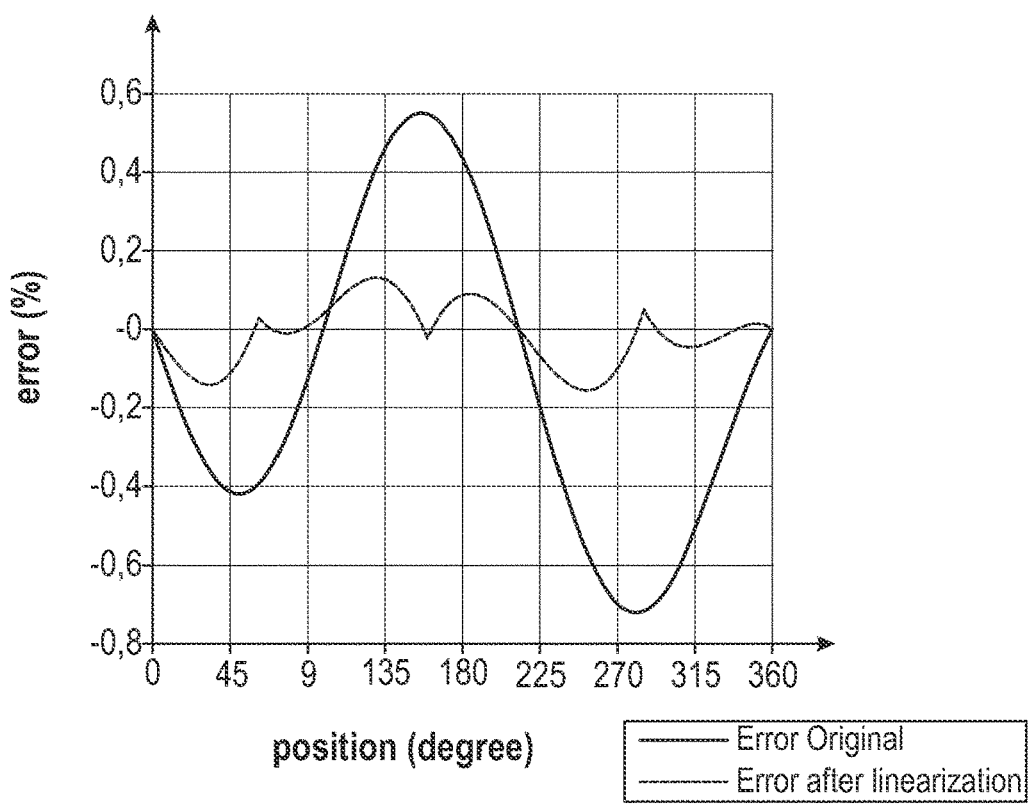

FIG. 4D shows the error output resulting from the output of the position error to which the new linearization function 2 with linearization points at 55°, 160° and 280°. The new maximum error is located at about 260°, resulting in a new corresponding linearization point at 260°.

Figure 4E:
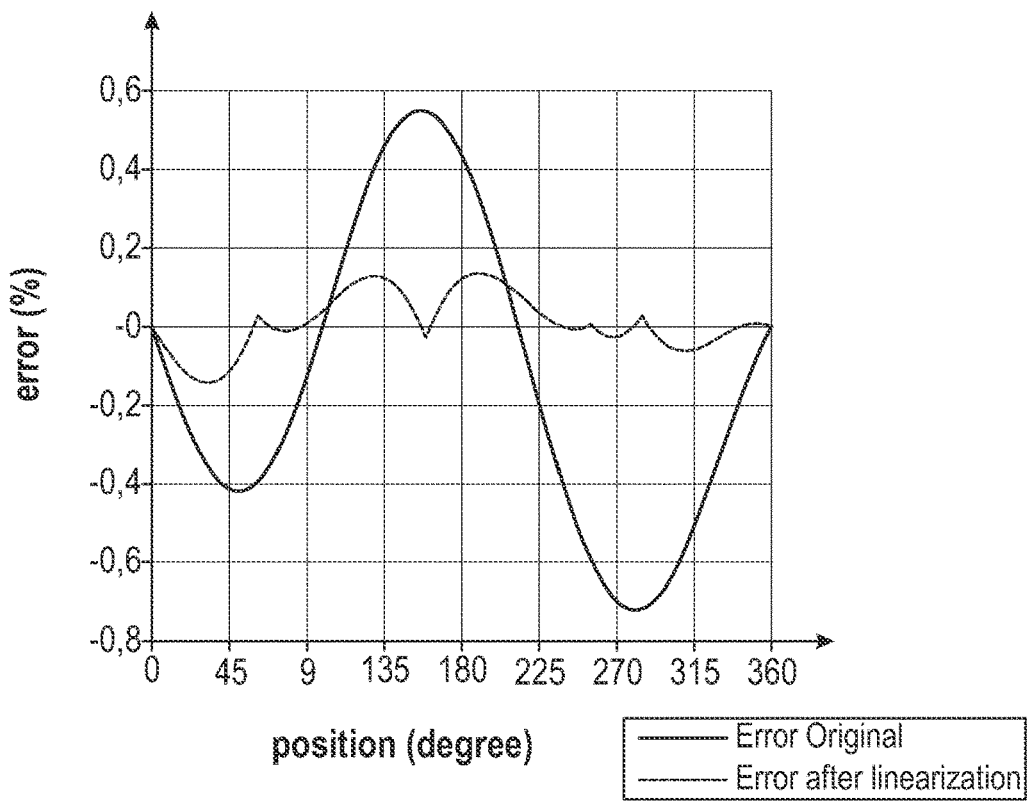

FIG. 4E shows the error output achieved by applying the linearization function 2 including the linearization points at 55°, 160°, 260° and 280°. The new maximum error of the error shown in FIG. 4E is at about 40° resulting in a corresponding linearization point at about 40°.

Figure 4F:
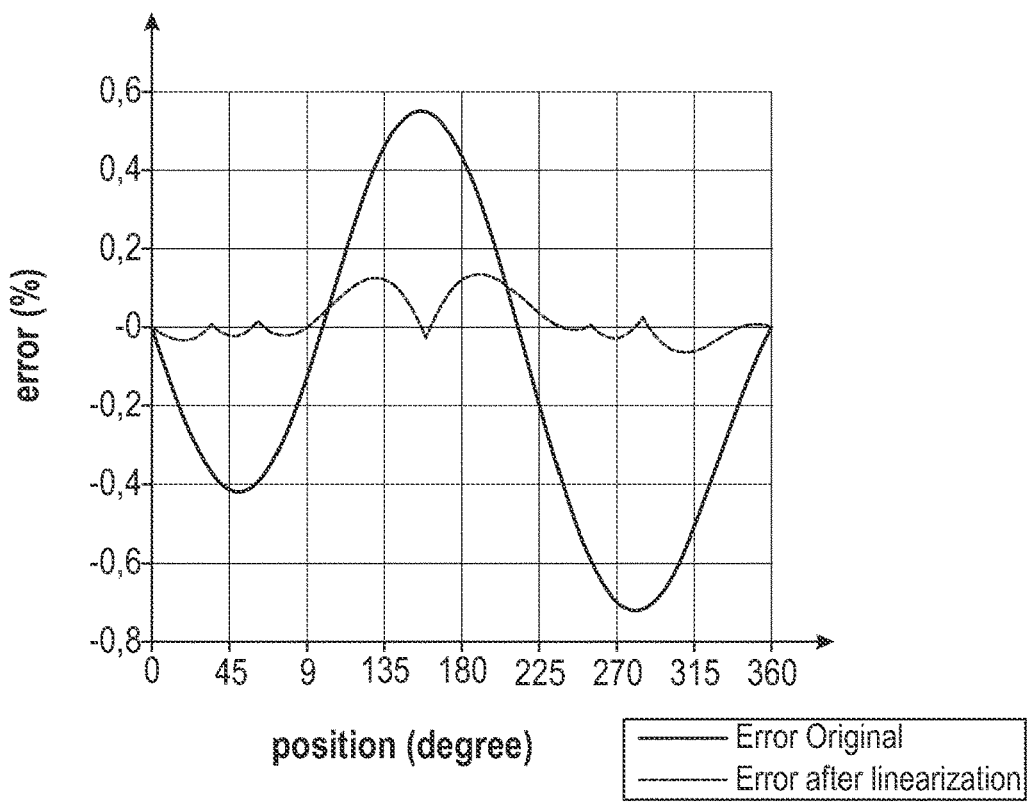

FIG. 4F shows the error after applying the linearization function 2 with linearization points at 40°, 55°, 160°, 260° and 280°. The new linearization point will be at about 10° due to the maximum error at this position.

Figure 4G:
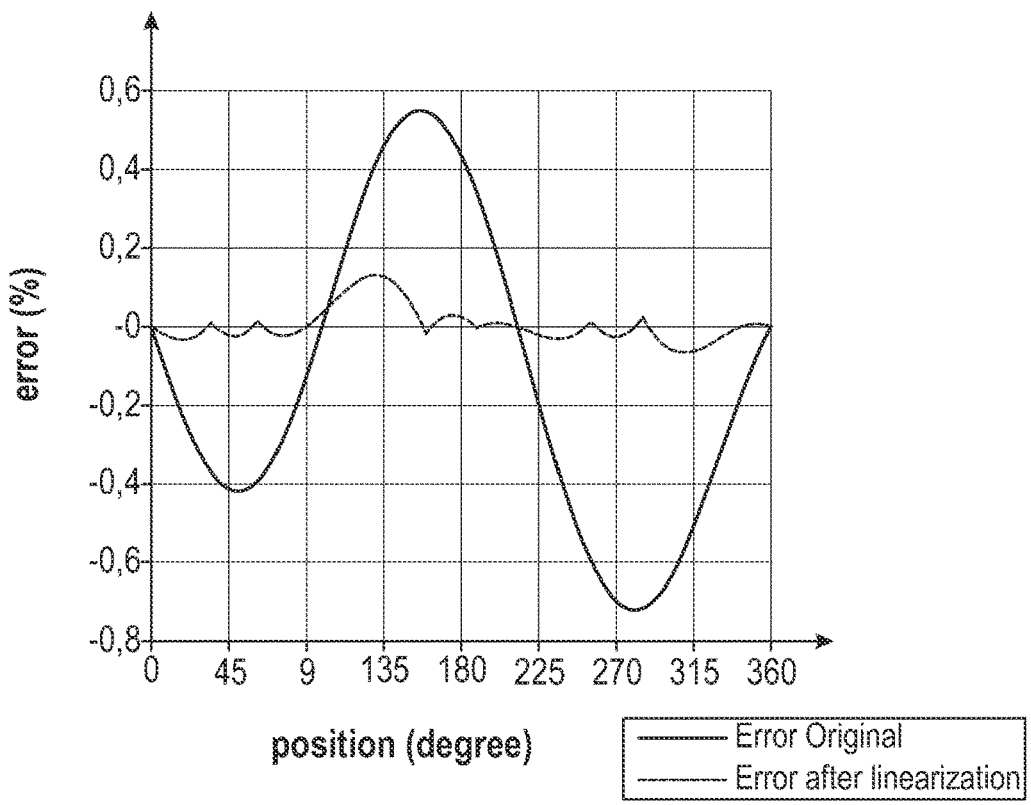

FIG. 4G shows the error after applying the linearization function 2 with linearization points at 40°, 55°, 160°, 190°, 260° and 280°.

Figure 4H:
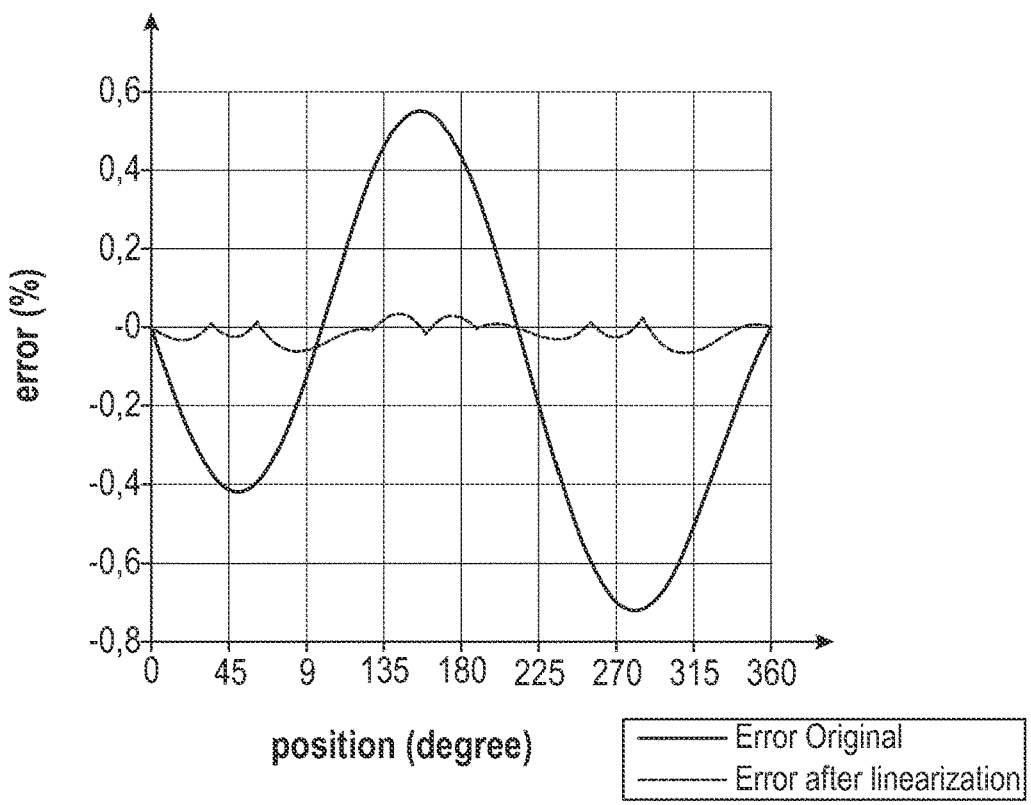

FIG. 4H shows the final error of the position sensor with a linearization function 2 having linearization points at 40°, 55°, 130°, 160°, 190°, 260° and 280°. Thus, the linearization function 2 has seven linearization points between the initial linearization point and the final linearization point.

In an embodiment, a method 1 for calibrating a linearization function 2 for correcting the output of a position sensor providing a continuous output position signal is described. The method 1 adds a new linearization point to the linearization function 2 by detecting the maximum error at the output of the position sensor and applying the new linearization function 2 to the output of the position sensor and repeating the steps adding new linearization points until all available linearization points have been defined.

What is claimed is:

1. A method for calibrating a linearization function for correcting an output of a position sensor providing a continuous output position signal, wherein the linearization function has a predetermined number of linearization points, wherein each linearization point specifies a correction factor for a corresponding position of the output signal of the position sensor, and wherein the method comprises:

setting an initial linearization point of the linearization function for a starting position to a start position of the position sensor;

setting a final linearization point of the linearization function for a last position to the final position of the position sensor;

determining the output of the position sensor for a full period by applying the linearization function to the position signal of the position sensor for the full period;

calculating an error vector for the full period of the position sensor by comparing the output of the position sensor with a reference signal, wherein the reference signal provides a predetermined position signal for the full period of the position sensor;

detecting the maximum error of the error vector and the corresponding position of the detected maximum error;

setting a next linearization point of the linearization function to the position of the maximum error and a correction factor corresponding to a difference between the output of the position sensor and the predetermined position signal for the position of the maximum error; and repeating the determining the output of the position sensor, calculating the error vector, detecting the maximum error and setting the next linearization point until all available linearization points have been set.

2. The method according to claim 1, comprising applying a zero calibration to the position sensor signal setting a mechanical initial position of the position sensor signal to a position value of zero.

3. The method according to claim 2, further comprising applying a zero calibration to the reference signal setting a mechanical initial position of the reference signal to a position value of zero.

4. The method according to claim 1, wherein the reference signal is provided by an external precision position sensor system.

5. The method according to claim 1, wherein the reference signal is generated by using a target input signal for calculating the position and a corresponding target output of the position sensor.

6. The method according to claim 1, further comprising sorting the linearization points of the linearization function in ascending order from the initial linearization point to the final linearization point.

7. The method according to claim 1, wherein the repeating of determining the output of the position sensor, calculating the error vector, detecting the maximum error and setting the next linearization point is stopped, if the next linearization point corresponds to an already existing linearization point of the linearization function within a predefined minimum distance.

8. The method according to claim 7, comprising comparing the position of the detected maximum error for a current linearization point with the detected positions of the maximum errors for all previous linearization points.

9. The method according to claim 1, comprising during each repetition, revising the correction factors corresponding to the difference between the output of the position sensor and the predetermined position signal for all linearization points between the initial linearization point and the final linearization point.

10. The method according to claim 9, wherein revising the correction factors is performed after the linearization point have been sorted in an ascending order.

11. A position sensor comprising a signal processing unit, wherein the signal processing unit implements the method according to claim 1.

* * * * *